United States Patent [19]

Marchionni et al.

[11] Patent Number: 5,488,181
[45] Date of Patent: Jan. 30, 1996

[54] PROCESS FOR PREPARING PERFLUOROPOLYETHERS

[75] Inventors: Giuseppe Marchionni, Milan; Pier A. Guarda, Nole; Maurizio Paganin, Cassina de'Pecchi, all of Italy

[73] Assignee: Ausimont S.p.A., Milan, Italy

[21] Appl. No.: 341,150

[22] Filed: Nov. 16, 1994

[30] Foreign Application Priority Data

Nov. 17, 1993 [IT] Italy .................................. MI93A2443

[51] Int. Cl.$^6$ ..................................................... C07C 43/30
[52] U.S. Cl. ............................................ 568/615; 568/614
[58] Field of Search ..................................... 568/615, 614

[56] References Cited

U.S. PATENT DOCUMENTS

| 3,665,041 | 5/1972 | Sianesi et al. | 568/615 |
| 3,683,027 | 8/1972 | Sianesi et al. | 568/615 |
| 3,847,978 | 11/1974 | Sianesi et al. | 568/615 |
| 4,085,137 | 4/1978 | Mitsch et al. | 568/615 |
| 5,144,092 | 9/1992 | Marraccini et al. | 568/615 |
| 5,220,076 | 6/1993 | Marraccini et al. | 568/615 |

FOREIGN PATENT DOCUMENTS

| 0167258A1 | 1/1986 | European Pat. Off. .. |
| 0193122A1 | 9/1986 | European Pat. Off. .. |
| 0195946A2 | 10/1986 | European Pat. Off. .. |
| 0223238A1 | 5/1987 | European Pat. Off. .. |
| 0244839A2 | 11/1987 | European Pat. Off. .. |
| 0340740A2 | 11/1989 | European Pat. Off. .. |
| 0393705A1 | 10/1990 | European Pat. Off. .. |
| 0393700A1 | 10/1990 | European Pat. Off. .. |
| 0510685A2 | 10/1992 | European Pat. Off. .. |
| 0538827A2 | 4/1993 | European Pat. Off. .. |
| 0538828A2 | 4/1993 | European Pat. Off. .. |

*Primary Examiner*—Werren B. Lone
*Attorney, Agent, or Firm*—Finnegan, Henderson, Farabow, Garrett & Dunner

[57] ABSTRACT

Process for preparing peroxidic perfluoropolyethers by oxidation of tetrafluoroethylene with oxygen, in liquid phase comprising a solvent and in the presence of a chemical initiator, at a pressure between 2 and 15 absolute atm and operating with a molar ratio of the tetrafluoroethylene to the chemical initiator higher than 35. The process allows to increase the molecular weight of the perfluoropolyethers at the same content of peroxidic oxygen.

12 Claims, No Drawings

PROCESS FOR PREPARING PERFLUOROPOLYETHERS

The present invention relates to a process for preparing peroxidic perfluoropolyoxyalkylenes, usually called peroxidic perfluoropolyethers.

As it is known, the peroxidic perfluoropolyethers are used as initiators of radical polymerizations and as crosslinking agents for polymers. They can be transformed into inert perfluoropolyethers (i.e. devoid of peroxidic groups and reactive terminal groups) which are used as inert fluids in various applications: "testing" in electronics, welding in vapour phase and in liquid phase, protection of the building materials, lubrication, etc. Moreover, functional perfluoropolyethers, used for instance as intermediates for polymers, can be obtained from peroxidic perfluoropolyethers by means of known techniques of chemical reduction.

According to the art, the peroxidic perfluoropolyethers are normally prepared by reaction of perfluoroolefins with oxygen under the action of ultraviolet radiations. Lately, it has been found, however, that the reaction can be carried out also without using ultraviolet radiations, provided that a substance acting as initiator of the polymerization, for instance fluorine and the compounds containing the fluoroxy group F—O—, is present. This process is disclosed in EP-A-0393700 and EP-A-0393705.

By changing the operating modalities, the known processes without the use of radiation allow to obtain peroxidic perfluorooxyalkylenes having different structural characteristics. In particular, by increasing the ratio between the amounts of monomer and initiator fed to the process, products with rising molecular weight are obtained; at the same time, however, the content of peroxidic oxygen (PO, defined as grams of peroxidic oxygen per 100 g of product) increases over the acceptability limit, estimable around a PO value equal to about 4, almost reaching the danger point set around 4.5–5. Perfluoropolyether products having molecular weight higher than about 5000 and contemporaneously with a PO value lower than the above mentioned maximum acceptability limit cannot practically be obtained in the absence of ultraviolet radiation.

As the peroxidic groups are randomly distributed along the polymer chains and the terminal groups are not functional, a functional derivative obtainable by chemical reduction of the polymer shows characteristics of average molecular weight (m) and of functionality (f) theoretically obtainable according to the following relations:

$$m = \frac{M}{\frac{PO \cdot M}{1600} + 1} \qquad f = \frac{2\left|\frac{PO \cdot M}{1600} + 1\right| - 2}{\frac{PO \cdot M}{1600} + 1}$$

wherein M is the number average molecular weight of the peroxidic crude product and PO is the value of the peroxidic content expressed as previously defined. From the above indicated relations it is noticed that the average molecular weight m of the derivative depends mainly on the PO, while the functionality f depends on the PO and on M and, in particular, if PO remains unchanged, it depends only on M.

Therefore, when an increase of the functionality of the derivatives is requested, it is necessary to increase the molecular weight of the peroxidic perfluoropolyether at the same content of peroxidic oxygen. The process disclosed in EP 0393705, however, does not allow to obtain a molecular weight higher than 4000 with a PO lower than 4. Example 11 of this patent does report a molecular weight higher than 4000, however with a PO content higher than 4; moreover, several repetitions of this example have given a product having a molecular weight of only about 2300.

The need of a high value of the functionality combined with a high molecular weight is particularly felt when the functional derivatives are used in the preparation of polycondensation polymers, since the properties of these polymers are strongly dependent on the functionality of the monomers. When a particularly high level of the properties of a polymer is needed, the functionality of the derivatives obtained from the perfluoropolyethers prepared according to the present invention can be further increased by purification processes, such as the chromatographic processes disclosed in EP-A-538827 and in EP-A-538828.

It is to be noticed that the problem of the control of the molecular weight and of the PO does not exist in the processes of photooxidation of the perfluoroolefins. It is in fact known that in the processes using ultraviolet radiations it is possible to obtain perfluoropolyethers with molecular weight and PO controlled independently from each other; such products can therefore be used for preparing functional derivatives with the desired characteristics.

The oxidation processes of the perfluoroolefins in the presence of ultraviolet radiations allow to obtain peroxidic perfluoropolyethers and functional derivatives without great difficulties. Said processes, however, involve plants with high costs, since their productivity is bound to the radiant power. The oxidation process of the perfluoroolefins in the presence of a chemical initiator allows, on the contrary, to achieve a high productivity; it does not allow, however, as said before, a simultaneous control of the PO and of the molecular weight M of the peroxidic perfluoropolyether and therefore of the features of the functional derivatives obtainable therefrom.

It has now been surprisingly found that the oxidation process of the tetrafluoroethylene in the presence of a chemical initiator can lead to particular raw perfluoropolyethers having high molecular weight M and at the same time a controlled PO, such as to provide by reduction functional derivatives with a good value of functionality f and a sufficiently high molecular weight m to be utilized for industrial purposes, when appropriate and selective reaction conditions are used.

Subject matter of the present application is therefore a process for the oxidation of the tetrafluoroethylene with oxygen in liquid phase comprising a solvent, utilizing a chemical initiator selected from the group consisting of fluorine and perfluoroalkylic hypofluorites containing up to 3 carbon atoms, which process makes possible to obtain perfluoropolyethers having a controlled content of peroxidic oxygen, with a PO value lower than 4 and a molecular weight M higher than 5000 by using, during the oxidation, a pressure between 2 and 15 absolute atm and a molar ratio of the tetrafluoroethylene to the chemical initiator higher than 35. In particular, the present invention deals with an oxidation process of tetrafluoroethylene with oxygen, using fluorine as initiator, to obtain peroxidic perfluoropolyethers consisting of units of structure ($CF_2$—$CF_2O$), ($CF_2$—$CF_2O$—O), ($CF_2O$) and ($CF_2O$—O) and having said features.

By means of chemical reduction, such peroxidic perfluoropolyethers can provide functional derivatives having, with the same molecular weight, a value of f higher than that of the derivatives prepared from the peroxidic perfluoropolyethers obtained with the known processes in the absence of ultraviolet radiation. Experimentally it has been found that the ratio (2-f)/m, which represents the deviation of the functionality f of a derivative from its limit value 2 related to the molecular weight, shows a rather regular variation, when the pressure in the preparation of the starting peroxidic perfluoropolyether is changed. For the derivatives obtained from the peroxidic perfluoropolyether prepared by the process of the invention, the ratio (2-f)/m is always lower than 3.75.

The results of the present invention are really unexpected as the oxidation process with a chemical initiator applied to the hexafluoropropylene and to its mixtures with tetrafluoroethylene does not point out any effect of the pressure on the PO and on the structural features of the product.

In the case of tetrafluoroethylene it has been found, for instance, that if a product with PO=3 is requested, working at atmospheric pressure (1 absolute atm) it is necessary to use a ratio TFE/F$_2$ of 30, where fluorine acts as initiator; a peroxidic perfluoropolyether having molecular weight M of 4500 is so obtained, from which a derivative with f=1.78 and m=477 can be obtained by chemical reduction. If, on the contrary, one operates according to the present invention at a pressure of 4.5 absolute atm, in order to obtain a perfluoropolyether having the same PO=3, it is necessary to use a ratio TFE/F$_2$ of 50. Unexpectedly this allows to obtain a product having molecular weight M of 8000, such as to provide, by chemical reduction, a derivative with f=1.86 and m=500. Therefore, by increasing the pressure perfluoropolyether products are unexpectedly and surprisingly obtained, which, with the same PO, present higher molecular weights, utilizable to prepare derivatives with a clearly superior functionality and with a practically unchanged molecular weight.

If, for instance, one intends to obtain a functional derivative with molecular weight m of about 800, a peroxidic perfluoropolyether with PO of about 1.5 must be prepared. This product, according to the process of the art without the use of radiations, is directly obtainable by synthesis with a molecular weight of 3700. The chemical reduction of this compound, according to one of the known processes specified further on, gives a derivative having functionality equal to about f=1.55. Alternatively, according to the art in absence of UV radiation, one can go up to the PO limit (about 4), obtaining a product with molecular weight of 5000; one can then carry out on such a product a controlled thermal or photochemical treatment in order to reduce the PO, as described in the patents reported hereinbelow, so not reducing the molecular weight of the peroxidic crude product substantially. A product still having a molecular weight of about 5000 and PO=1.68, which by reduction gives a derivative having m=800 and f=1.68, can be obtained in this way. Products with such a low functionality grade are of poor industrial interest, since, if utilized for instance in polycondensation reactions, they lead to products with low molecular weight.

In the further description of the process of the present invention fluorine is used as initiator, even if the use as initiator of the perfluoroalkylic hypofluorites having up to 3 carbon atoms is within the scope of the invention. The term "initiator" is used without a precise reference to the reaction mechanism. As a matter of fact, the possibility that fluorine, or the hypofluorite, reacts with the various components present in the reaction mixture to give rise to the true initiator of the reaction itself, is not to be preliminarily excluded.

A gaseous flow of tetrafluoroethylene, a gaseous flow of oxygen and a gaseous flow of fluorine are commonly fed into the liquid phase, initially consisting of the solvent. Sometimes an inert gas is also fed into the liquid phase, optionally mixed with fluorine or with the oxygen flow. The inert gas, if used, is preferably selected from nitrogen, argon, helium, CF$_4$, and C$_2$F$_6$. A particular case of the use of nitrogen as inert gas is given by the use of air instead of oxygen.

The temperature at which the liquid phase is kept during the reaction is generally from −100° C. to −20° C., preferably from −90° C. to −40° C.

The solvent is preferably selected from linear and cyclic fluorocarbons, optionally containing hydrogen and/or chlorine. Examples of preferred solvents are: CFCl$_3$, CF$_2$Cl$_2$, CF$_2$HCl, CF$_3$—CF$_2$H, CF$_3$—CFH$_2$, CF$_2$H—CF$_2$H, CHClF—CF$_3$ and/or CHF$_2$—CClF$_2$ optionally mixed with CHF$_2$—CH$_2$F. Azeotropic mixtures of two or more of the cited compounds can also be used. Other utilizable solvents are perfluoropropane, perfluorocyclobutane, perfluorocyclohexane, chloropentafluoroethane, 1,1,2-trichloro-1,2,2-trifluoroethane, 1,2-dichlorotetrafluoroethane. Also perfluoroamines and perfluoroethers and polyethers, optionally containing hydrogen, can be used as solvent. Examples of this type are: CH$_3$OCF$_2$CFHCF$_3$, CF$_2$H—O—CF$_2$H, CF$_3$CFHCF$_2$CF$_3$, CF$_3$CFHCFHCF$_2$CF$_3$, F(CF$_2$—CF$_2$—CX$_2$O)$_n$CF$_2$CF$_2$H with X=F, H and n from 0 to 4, extremes included, and T—O(C$_3$F$_6$O)$_p$(C$_2$F$_4$O)$_q$(CF$_2$O)$_r$—T' with p, q and r from 0 to 3, extremes included, and T and T', equal or different each other, selected from CF$_3$, C$_2$F$_5$, C$_3$F$_7$, CF$_2$H and CF$_3$CFH, the perfluorooxyalkylenic units being randomly distributed in the molecule. The choice of the solvent can affect the working conditions of the process which, however, can be easily fixed by a skilled person.

The total pressure of the reaction is from 2 to 15 absolute atm, preferably from about 3 to 10 absolute atm.

The oxygen is continuously fed into the liquid phase at a partial pressure from 2 to 12 absolute atm and preferably from 3 to 8 absolute atm.

The tetrafluoroethylene is fed in such an amount as to maintain the molar ratio (fed TFE)/(fed F$_2$)>35, as the molecular weight of the perfluoropolyether increases when this ratio increases. Thanks to the operation under pressure, a ratio (fed TFE)/(fed F$_2$) up to 150 may be used. The fluorine used as initiator is fed into the liquid phase in amounts generally from 0.001 to 0.1 moles per hour per liter of liquid phase.

The process can be carried out both in a discontinuous way and, preferably, in a continuous way. The solvent and the unreacted perfluoroolefin are separated from the reaction mixture by distillation, obtaining the peroxidic perfluoropolyether as a residue in the form of an oily liquid. Solvent and unreacted perfluoroolefin are recycled to the process.

The products have the following general formula:

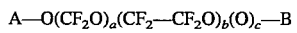

A—O(CF$_2$O)$_a$(CF$_2$—CF$_2$O)$_b$(O)$_c$—B wherein: a+b>40 for a molecular weight higher than 5000;

b/a=0.1 to 40 and, more commonly, 0.2 to 20;

c/a+b=0.01 to 0.3.

Since mixtures of polymeric chains of different length are involved, said indexes assume average values which are not necessarily integers. If, on the contrary, the single polymeric chains are taken into consideration, the indexes obviously assume the value of an integer; in such a case a+b is an integer from 1 to 1000 and, more commonly, from 2 to 500. In the formula the (O) units mean oxygen atoms of peroxidic nature, i.e. oxygen atoms bound to an oxygen of a perfluorooxyalkylenic unit, which come therefore to form a peroxidic group —O—O—. The perfluorooxyalkylenic units and the (O) units are randomly distributed inside the chain. The terminal groups A and B, same or different each other, represent the following radicals: $WCF_2—$ and $WCF_2—CF_2—$, wherein W indicates a fragment derived from the initiator molecule.

The number average molecular weight M of the peroxidic perfluoropolyethers obtained by means of the process of the invention is higher than 5000 and can reach, if desired, also a value of 10000 or higher. At the same time the amount of peroxidic oxygen (PO) in the products obtained by the process of the invention can be controlled, keeping it under 4 grams per 100 grams of product, which is considered the acceptability limit for products of this type.

Various parameters allow to affect the molecular weight and the structural composition of the products obtained by the process according to the present invention. According to what described in EP-A-0393705, by increasing the concentration of the tetrafluoroethylene in the liquid phase the molecular weight of the products increases and by increasing the tetrafluoroethylene/fluorine ratio an increase of the molecular weight as well as of the percentage content of the units ($CF_2—CF_2O$) likewise occurs. Quite surprising, on the contrary, is the effect of a variation of the working pressure of the reactive system on the content of the peroxidic oxygen.

It can be noticed from the data of the examples how an increase of the system pressure with the same ratio $TFE/F_2$ causes a decrease in the PO. This means that the ratio $TFE/F_2$ can be increased and the PO can be maintained within values useful from the practical point of view and acceptable from the safety point of view, if the pressure rises. As the molecular weight M substantially depends on the ratio $TFE/F_2$, it is clear how, by operating at a higher pressure, it is possible to obtain higher molecular weights keeping the PO unchanged.

The main advantage of this invention is therefore to give a process for preparing peroxidic perfluoropolyethers much more flexible than the one of the art. In particular the new process makes possible to obtain a broad range of products with different content of molecular weight and of peroxidic oxygen.

The results of the present invention are unexpected with respect to the art. In particular as regards the traditional photooxidation process of the tetrafluoroethylene in the presence of ultraviolet radiations, Sianesi in "La Chimica e l'Industria", Vo. 55, No. 2 (1973), page 212, states in fact for the process in gaseous phase the independence of the reaction kinetics, and therefore of the features of the product, from the oxygen pressure. Some experimental tests carried out by the Applicant for the photooxidation process in liquid phase lead to the same conclusion. As to the art on the processes based on the use of a chemical initiator, it is to be noticed that the already mentioned patents, even if they mention the possibility of working in a certain field of pressures, do not exemplify the use of a pressure different from the atmospheric one and above all they do not give any indication how one can have a control on the content of peroxidic oxygen in the product, which is the problem to be solved according to the present invention.

The peroxidic perfluoropolyethers obtained with the process of the invention can be transformed into perfluoropolyethers with functional terminals by operating with methods known in the art, for instance according to EP 167258, EP 195946, EP 223238, EP 244839, U.S. Pat. No. 3,683,027 and U.S. Pat. No. 3,847,978, the last one optionally in combination with U.S. Pat. No. 4,085,137. If wanted, also neutral perfluoropolyethers with a molecular weight from 500 to 15000 can be obtained, operating for instance according to U.S. Pat. No. 3,665,041, EP 167258 and EP 223238.

The following examples are to be considered illustrative but not limitative of the present invention.

EXAMPLES

Examples 1–20: peroxidic perfluoropolyethers by oxidation of tetrafluoroethylene (examples 1 to 5 are comparative)

The reaction conditions, the yields and the features of the obtained peroxidic perfluoropolyethers are summarized in Tables 1A and 1B. The experimental procedure is the same in all the examples. Example 18 is described in detail hereinunder.

In a 1 l nickel reactor, equipped with stirrer, thermocouple for the temperature survey, gas feeding pipes reaching the reactor bottom, 1270 g of dichlorodifluoromethane at the T of –82° C. are loaded.

An oxygen flow of 413 Nml/min (24.8 Nl/h) is then fed through one of the feeding pipes; through an adjustable valve placed on the line for the gas outlet from the reactor cycle, the system is put at a relative pressure of 3.5 atm (4.5 absolute atm) and kept at such a pressure during the whole test.

The stirrer is operated at a speed of 1300 r.p.m. Into the reactor are then fed 159 Nml/min (9.54 Nl/h) of TFE through a feeder different from that of the oxygen and 3.0 Nml/min (0.18 Nl/h) of fluorine which is premixed in the oxygen flow. The control of the temperature during the reaction is obtained by a cooling coil system which is put outside the reactor itself, using liquid nitrogen as refrigerating fluid. The reaction is carried out for a time of 2 hours, during which the peroxidic perfluoropolyether gathers in the liquid phase. Two drawings of the liquid phase (after a reaction time of 30 and 120 minutes) and 4 drawings of the gaseous phase outflowing from the reactor are carried out in order to check the proceeding of the reaction and to carry out the material balances.

After two hours, reactants feeding is stopped, atmospheric pressure is restored in the system and the solvent is recovered by distillation. 93 g of quite limpid crude reaction product are so obtained. The product, analyzed by IR spectroscopy, does not show any absorption band in the typical zone of the groups —CO—F. At the iodometric analysis the product results to have a content of active oxygen equal to 4.0 g/100 g of product. The $^{19}F$—NMR analysis points out for the product the following structure:

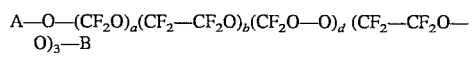

wherein A and B, same or different each other, represent the terminal groups $CF_3—$ and $CF_3—CF_2—$, present in the ratio of 1:28. The number average molecular weight M of the product is 8500. The molar fractions of the chain units result, respectively: a=0.071; b=0.620; d=0.008; e=0.301.

The product viscosity, measured by a Cannon-Fenske viscosimeter at the temperature of 20° C., is 678 cSt. The TFE conversion, expressed as (reacted TFE)/(fed TFE) ratio is 96%. The yield in polymer, expressed as (TFE converted to polymer)/(reacted TFE) ratio, is 92%, the yield in $COF_2$ is 7% and the one in epoxide is 1.4%.

TABLE 1A

TFE oxidation initiated from fluorine: reaction conditions and yields of the peroxidic PFPE (*).

| EXAMPLE | PRESSURE abs. atm | FLUORINE | TFE/F$_2$ by moles | PRODUCTIVITY g/h | CONVERSION TFE % | YIELD TFE % |
|---|---|---|---|---|---|---|
| 1** | 1.0 | 5.8 | 27.2 | 41.2 | 98 | 83 |
| 2** | 1.0 | 5.6 | 28.2 | 42.7 | 96 | 84 |
| 3** | 1.0 | 5.2 | 30.6 | 45.0 | 95 | 94 |
| 4** | 1.0 | 4.8 | 32.9 | 44.2 | 90 | 92 |
| 5** | 2.0 | 4.8 | 33.1 | 38.2 | 100 | 76 |
| 6 | 2.0 | 4.4 | 36.1 | 42.6 | 95 | 87 |
| 7 | 2.0 | 4.0 | 39.7 | 42.7 | 92 | 89 |
| 8 | 2.9 | 4.0 | 39.7 | 43.0 | 99 | 84 |
| 9 | 2.9 | 3.8 | 41.8 | 43.2 | 96 | 87 |
| 10 | 2.9 | 3.6 | 44.2 | 43.0 | 93 | 88 |
| 11 | 3.0 | 3.8 | 41.8 | 43.1 | 95 | 88 |
| 12 | 4.0 | 3.5 | 45.4 | 43.3 | 97 | 86 |
| 13 | 4.0 | 3.3 | 48.2 | 42.6 | 92 | 90 |
| 14 | 4.0 | 3.2 | 49.7 | 44.4 | 94 | 90 |
| 15 | 4.0 | 3.1 | 51.3 | 43.7 | 91 | 91 |
| 16 | 4.5 | 3.4 | 46.8 | 44.1 | 94 | 90 |
| 17 | 4.5 | 3.2 | 49.7 | 45.3 | 95 | 91 |
| 18 | 4.5 | 3.0 | 53.0 | 46.5 | 96 | 92 |
| 19 | 5.0 | 2.8 | 56.7 | 36.9 | 85 | 83 |
| 20 | 6.0 | 2.2 | 72.3 | 43.9 | 94 | 88 |

*In all the tests: T = −82° C.; TFE flow rate = 159 Nml/min; O$_2$ flow rate = 413 Nml/min; solvent CCl$_2$F$_2$, but CF$_3$—CF$_2$H in example 19; solvent vol. 750; reaction time 2 hours.
**Comparative examples.

TABLE 1B

TFE oxidation initiated from fluorine: features of the peroxidic PFPE (*).

| EXAMPLE | PO (g/100 g) | M (NMR) | VISCOSITY (cSt at 20° C.) | Units C$_2$/ units C$_1$ (b + e/a + d) |
|---|---|---|---|---|
| 1** | 1.23 | 3500 | 36 | 1.66 |
| 2** | 2.05 | 4000 | 59 | 3.19 |
| 3** | 2.78 | 4450 | 99 | 5.05 |
| 4** | 3.78 | 4800 | 146 | 7.85 |
| 5** | 0.98 | 4150 | 39 | 0.77 |
| 6 | 2.10 | 5500 | 108 | 3.90 |
| 7 | 3.47 | 6200 | 230 | 7.55 |
| 8 | 1.50 | 6250 | 97 | 2.30 |
| 9 | 2.20 | 6650 | 148 | 4.14 |
| 10 | 3.10 | 7100 | 240 | 6.54 |
| 11 | 2.25 | 6700 | 148 | 4.09 |
| 12 | 1.70 | 7400 | 77 | 2.87 |
| 13 | 2.98 | 7550 | 299 | 6.62 |
| 14 | 3.12 | 7450 | 325 | 6.81 |
| 15 | 3.85 | 8300 | 536 | 10.80 |
| 16 | 2.15 | 8050 | 201 | 3.81 |
| 17 | 3.15 | 8100 | 344 | 7.43 |
| 18 | 4.0 | 8500 | 678 | 11.40 |
| 19 | 3.59 | 7800 | 410 | 5.33 |
| 20 | 3.48 | 9550 | 759 | 8.63 |

*Preparation conditions in all the test: T = 82° C.; TFE flow rate = 159 Nml/min; O$_2$ flow rate = 413 Nml/min; reaction solvent CCl$_2$F$_2$, but CF$_3$—CF$_2$H in example 19; reaction solvent vol. 750 ml; reaction time 2 hours.
**Comparative examples.

Preparation of Derivatives

Table 2 summarizes values of the average molecular weight m, of the funcionality f and of (2-f)/m for the derivatives obtainable from peroxidic perfluoropolyether prepared according to the previous examples 1 to 20. Experimental detail of the preparation of the derivatives can be found in the following example 21.

EXAMPLE 21

50 g of product coming from Example 8 are put in a flask equipped with stirrer, thermometer, refrigerant and dripping funnel, and charged with 160 ml of CF$_2$Cl—CFCl$_2$ and 80 ml of CH$_3$OH. 25 g of aqueous solution of HI at 57% concentration are then fed under stirring through dripping funnel, keeping the temperature around 15° C. Once the addition is over, the mixture is brought to reflux and maintained refluxing for about 2 hours in order to carry out the reaction. After the disappearance of the peroxidic groups has been ascertained by $^{-19}$F-NMR analysis, the mixture is transferred to a separatory funnel; the lower phase is separated, washed once with a cold 0.01M aqueous solution of Na$_2$S$_2$O$_3$ in order to remove the remained iodine and subsequently with water, then dried with Na$_2$SO$_4$ and filtered.

After distillation of the solvent, 46 g of product are obtained, which at the $^{19}$F-NMR analysis results to consist of perfluoropolyether having formula Y—O(CF$_2$O)$_a$(CF$_2$—CF$_2$O)$_b$—Y', with a ratio b/a=1.87 and with terminal groups Y and Y' of —CF$_3$, —CF$_2$—CF$_3$ or —CF$_2$—COOCH$_3$ type. The functionality f of the product is 1.71 and its number average molecular weight m is 930.

The same procedure was followed to prepare the derivatives by chemical reduction of all the other peroxidic perfluoropolyethers and to determine the values of f and m.

TABLE 2

Molecular weight and functionality for the derivatives obtained by chemical reduction of the peroxidic PFPE.

| Peroxidic PFPE: example originating the sample | m | f | (2 − f)/m · 10$^4$ |
|---|---|---|---|
| 1** | 948 | 1.46 | 5.72 |
| 2** | 690 | 1.66 | 4.93 |
| 3** | 550 | 1.75 | 4.54 |
| 4** | 435 | 1.82 | 4.14 |
| 5** | 1172 | 1.43 | 4.82 |

TABLE 2-continued

Molecular weight and functionality for the derivatives
obtained by chemical reduction of the peroxidic PFPE.

| Peroxidic PFPE: example originating the sample | m | f | $(2 - f)/m \cdot 10^4$ |
|---|---|---|---|
| 6 | 695 | 1.74 | 3.74 |
| 7 | 500 | 1.85 | 3.00 |
| 8 | 930 | 1.71 | 3.12 |
| 9 | 670 | 1.79 | 3.13 |
| 10 | 505 | 1.85 | 2.97 |
| 11 | 675 | 1.80 | 2.96 |
| 12 | 850 | 1.77 | 2.71 |
| 13 | 540 | 1.85 | 2.78 |
| 14 | 510 | 1.86 | 2.75 |
| 15 | 430 | 1.88 | 2.79 |
| 16 | 710 | 1.82 | 2.54 |
| 17 | 515 | 1.86 | 2.72 |
| 18 | 380 | 1.91 | 2.37 |
| 19 | 510 | 1.87 | 2,55 |
| 20 | 520 | 1.88 | 2,31 |

**Comparative examples.

Comparative Examples: Use of a Different Olefin

The following examples show that the pressure has no influence in the preparation of perfluoropolyethers from hexafluoropropene and from mixtures of hexafluoropropene and tetrafluoroethylene.

EXAMPLE 22 (hexafluoropropene at 1 atm)

Into a 1 l nickel reactor, equipped with stirrer, thermocouple for the temperature measurement, gas feeding pipes reaching the reactor bottom, 650 ml of liquid hexafluoropropene at the T of −77° C. are loaded.

Then a gaseous mixture formed by 330 Nml/min of oxygen, 440 Nml/min of nitrogen and 6.55 Nml/min of fluorine is fed through one feeding pipe, keeping the T at −77° C., the pressure at 1 absolute atm and the stirring at 1300 r.p.m. The reaction is carried out for a time of 2 hours, during which the peroxidic perfluoropolyether gathers on the liquid phase. When the reaction is over, reactants feeding is stopped and the unreacted hexafluoropropene is recovered by distillation. 159 g of quite limpid crude reaction product are so obtained. The product, submitted to iodometric analysis, results to have a content of active oxygen equal to 0.35 g/100 g of product (PO=0.35).

The $^{19}$F-NMR analysis points out the following structure:

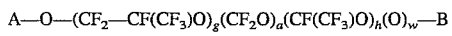

wherein A and B, equal or different each other, are formed by $CF_3CF_2CF_2$—, $(CF_3)_2CF$—, $CF_3$— with a ratio (a+h)/g equal to 0.01 and molecular weight M equal to 3500. The product viscosity, measured by a Cannon-Fenske viscosimeter at the temperature of 20° C. has resulted to be 646 cSt.

EXAMPLE 23 (hexafluoropropene at 4 arm)

By operating according to the same procedure of Example 22 and keeping, however, the working pressure at 4 absolute arm. 145 g of peroxidic perfluoropolyether are obtained, which at the iodometric analysis results to have a content of active oxygen equal to 0.36 g/100 g of product (PO=0.36). The $^{19}$F-NMR analysis of the product does not show meaningful differences compared with the product obtained in Example 22.

EXAMPLE 24
(tetrafluoroethylene+hexafluoropropene at 1 atm)

In a 1 l nickel reactor, equipped with stirrer, thermocouple for the temperature measurement, gas feeding pipes reaching the reactor bottom, 618 ml of liquid hexafluoro- propene at the T of −77° C. are loaded.

Then a gaseous mixture formed by 330 Nml/min of oxygen, 440 Nml/min of nitrogen and 6.55 Nml/min of fluorine is fed through one feeding pipe, and 60 Nml/min of tetrafluoroethylene is fed through a second feeding tube, keeping the T at −77° C., the pressure at 1 absolute atm and the stirring at 1300 r.p.m. The reaction is carried out for a time of 2 hours, during which the peroxidic perfluoropolyether gathers on the liquid phase. When the reaction is over, reactants feeding is stopped and the unreacted hexafluoropropene is recovered by distillation. 130 g of quite limpid crude reaction product are so obtained. The product, submitted to iodometric analysis, results to have a content of active oxygen equal to 1.19 g/100 g of product (PO=1.19 ).

The $^{19}$F-NMR analysis points out the following structure:

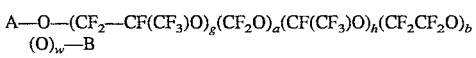

wherein A and B, equal or different each other, are formed by $CF_3CF_2CF_2$—, $(CF_3)_2CF$—, $CF_3CF_2$—, $CF_3$— with a ratio g/b =1.9, a ratio (a+h)/g equal to 0.01 and molecular weight M equal to 2500. The product viscosity, measured by a Cannon-Fenske viscosimeter at the temperature of 20° C. has resulted to be 187 cSt.

EXAMPLE 25
(tetrafluoroethylene+hexafluoropropene at 4 atm)

By operating according to the same procedure of Example 24 and keeping, however, the working pressure at 4 absolute atm., 135 g of peroxidic perfluoropolyether are obtained, which at the iodometric analysis results to have a content of active oxygen equal to 1.16 g/100 g of product (PO=1.16).

The $^{19}$F-NMR analysis of the product does not show meaningful differences compared with the product obtained in Example 24.

We claim:

1. Process for preparing peroxidic perfluoropolyethers, having molecular weight M higher than 5000 and content by weight of peroxidic oxygen lower than 4% of the total weight, consisting of reacting tetrafluoroethylene with oxygen in liquid phase comprising a solvent, at temperature from −100° C. to 20° C. and in the presence of a chemical initiator selected from the group consisting of fluorine and perfluoroalkyl hypofluorites containing from 1 to 3 carbon atoms, characterized in that the molar ratio of the tetrafluoroethylene to the chemical initiator is from 35 to 150 and the total pressure is in the range from 2 to 15 absolute atm.

2. Process according to claim 1 wherein the total pressure is from 3 to 10 absolute atm.

3. Process according to claim 1, wherein the partial pressure of the oxygen is from 2 to 12 absolute atm.

4. Process according to claim 3 wherein the partial pressure of the oxygen is from 3 to 8 absolute atm.

5. Process according to claim 1, wherein the reaction temperature is from −90° to −40° C.

6. Process according to claim 1, wherein the chemical initiator is fluorine.

7. Process according to claim 1, wherein the chemical initator is a perfluoroalkyl hypofluorite containing from one to three carbon atoms.

8. Process according to claim 1, wherein a flow of gaseous oxygen, a gaseous or liquid flow of the initiator and a gaseous flow of tetrafluoroethylene are fed into a liquid phase comprising a solvent.

9. Process according to claim 8, wherein an inert gas is also fed into the liquid phase.

10. Process according to claim 9, wherein the inert gas is selected from nitrogen, argon, helium, $CF_4$ and $C_2F_6$.

11. Process according to claim 1, wherein the initiator is fed into the liquid phase in amount from 0.001 to 0.1 moles per hour per liter of liquid phase.

12. Process according to claim 1, wherein the solvent is selected from the group consisting of linear and cyclic fluorocarbons, optionally containing hydrogen and/or chlorine, of perfluoroamines and of perfluoropolyethers.

\* \* \* \* \*